(12) United States Patent
Gabel et al.

(10) Patent No.: US 9,302,931 B2
(45) Date of Patent: Apr. 5, 2016

(54) GLASS CERAMIC ARTICLE AND METHOD AND DEVICE FOR CERAMIZING GLASS

(75) Inventors: Falk Gabel, Schlangenbad (DE); Thoralf Johansson, Nieder-Olm (DE); Uwe Martens, Mainz Kastel (DE); Christian Roos, Bad Soden Schmünster (DE); Friedrich Georg Schroder, Ingelheim (DE)

(73) Assignee: SCHOTT AG, Mainz (DE)

( * ) Notice: Subject to any disclaimer, the term of this patent is extended or adjusted under 35 U.S.C. 154(b) by 1223 days.

(21) Appl. No.: 13/262,284

(22) PCT Filed: Mar. 20, 2010

(86) PCT No.: PCT/EP2010/001766
§ 371 (c)(1),
(2), (4) Date: Jan. 5, 2012

(87) PCT Pub. No.: WO2010/112148
PCT Pub. Date: Oct. 7, 2010

(65) Prior Publication Data
US 2012/0094079 A1  Apr. 19, 2012

(30) Foreign Application Priority Data
Mar. 31, 2009 (DE) .......................... 10 2009 015 089

(51) Int. Cl.
| | |
|---|---|
| C03B 32/02 | (2006.01) |
| C03C 3/083 | (2006.01) |
| C03B 29/08 | (2006.01) |
| C03B 35/16 | (2006.01) |
| C03B 35/18 | (2006.01) |
| C03C 10/00 | (2006.01) |

(52) U.S. Cl.
CPC ................. *C03C 3/083* (2013.01); *C03B 29/08* (2013.01); *C03B 32/02* (2013.01); *C03B 35/16* (2013.01); *C03B 35/181* (2013.01); *C03C 10/0027* (2013.01); *Y10T 428/24488* (2015.01)

(58) Field of Classification Search
CPC .............................. C03B 27/012; C03B 32/02
See application file for complete search history.

(56) References Cited

U.S. PATENT DOCUMENTS

| | | | | | |
|---|---|---|---|---|---|
| 3,163,512 | A | * | 12/1964 | Schill ...................... | C03B 19/08 501/39 |
| 3,540,703 | A | * | 11/1970 | Bezbozhny ............. | C03B 25/08 432/133 |
| 3,804,608 | A | | 4/1974 | Gaskell et al. | |

(Continued)

FOREIGN PATENT DOCUMENTS

| | | |
|---|---|---|
| EP | 1 146 018 | 10/2001 |
| EP | 1 321 440 | 6/2003 |
| GB | 2 204 311 | 11/1988 |

OTHER PUBLICATIONS

International Preliminary Examination Report issued for PCT/EP2010/001766 and dated Oct. 27, 2011.

(Continued)

*Primary Examiner* — Angela Ortiz
*Assistant Examiner* — Cynthia Szewczyk
(74) *Attorney, Agent, or Firm* — Pearl Cohen Zedek Latzer Baratz LLP (57) ABSTRACT

The invention relates to a method and to a device for ceramizing green glass in a continuous furnace, with the ceramization being carried out directly on rollers.

6 Claims, 7 Drawing Sheets

(56) References Cited

U.S. PATENT DOCUMENTS

| | | | |
|---|---|---|---|
| 3,809,542 A | 5/1974 | Lythgoe | |
| 4,042,362 A * | 8/1977 | MacDowell | C03C 10/00 501/10 |
| 4,851,022 A * | 7/1989 | Gunthner | C03B 29/10 432/122 |
| 5,588,979 A * | 12/1996 | Miyazaki | C03B 7/07 65/164 |
| 5,792,524 A * | 8/1998 | Lingart | C03B 19/06 428/319.1 |
| 6,846,760 B2 * | 1/2005 | Siebers | C03C 3/085 501/32 |
| 7,406,841 B2 * | 8/2008 | Mitra | C03B 32/02 501/2 |
| 2004/0065115 A1 * | 4/2004 | Mueller | C03B 17/06 65/29.17 |
| 2005/0016214 A1 * | 1/2005 | Hsu | C03B 13/04 65/33.9 |

OTHER PUBLICATIONS

International Search Report issued for PCT/EP2010/001766 and dated Aug. 26, 2010.

* cited by examiner

GLASS CERAMIC ARTICLE AND METHOD AND DEVICE FOR CERAMIZING GLASS

CROSS-REFERENCE TO RELATED APPLICATIONS

This application is a National Phase Application of PCT International Application No. PCT/EP2010/001766, International Filing Date 20 Mar. 2010, claiming priority of German Patent Application DE 10 2009 015 089.7, filed 31 Mar. 2009, each incorporated by reference in its entirety.

FIELD OF THE INVENTION

The invention relates to a method and a device for ceramizing green glass and to glass ceramic products that can be produced using the method. In particular, the invention relates to a method and a device that allow green glass to be ceramized directly on the rollers of a conveying system and to the products that can be produced using this method and the device.

BACKGROUND

Summary

Continuous ceramizing methods that directly follow the hot-forming process are known from the prior art. U.S. Patent Application No. 2005/016214 A1 teaches a continuous method for producing crystallized glass plates and a device for carrying out the method. This method comprises the steps of melting a crystallizable glass material, adjusting the viscosity of the molten material, rolling the glass between rollers and/or cylinders to form a glass ribbon, and passing the glass ribbon through a crystallization tunnel in which the glass ribbon is crystallized. According to the teaching, the glass ribbon is transported in the crystallization tunnel on a conveyor that is composed of rollers made of a heat-resistant material. A "pressing roller" is optionally provided upstream of the entrance into the crystallization tunnel and presses the freshly formed glass ribbon against the conveyor so as to obtain a planar ribbon.

The cited document, however, does not contain any information on many key parameters, for example, the total duration of the ceramization process, the maximum temperatures during ceramization and related viscosities of the glass ribbon, or the distances between the individual rollers of the conveyor. However, this information is essential in order to be able to produce glass ceramic articles having sufficient flatness.

During the phase of maximum temperature load, which is to say, in general, during volume crystallization, the glass ribbon has very low viscosities, which cause the glass ribbon to "sag" between the rollers if the distances are too great, thus causing the ceramized product to exhibit strong waviness. It would therefore be desirable to be able to control the method so that the period of the lowest viscosity, which is reached, in general, just prior to and at the start of volume crystallization, is passed in the shortest time possible. As a person skilled in the art knows, however, this is difficult because short periods of high viscosity are gained by ceramization temperatures that, at least intermittently, are very high, which in turn make the exothermal process of ceramizing difficult to control. Moreover, given the higher temperatures that are required, short ceramizing times also result in lower minimal viscosities of the ceramizing green glass, making it more difficult to handle because it deforms more easily.

None of these relationships and parameters are mentioned in the cited document. It must therefore be assumed that the method described relates only in general terms to the feasibility of continuous ceramization on rollers, while the quality of the products generated plays a rather subordinate role. Products that are produced using a method devoid of specifics to this extent presumably exhibit a high degree of waviness and are therefore not suited for many applications that require flat products without subsequent treatment, such as a leveling grinding or polishing process, for example.

In addition to the method described, other methods for continuously ceramizing green glass are also known in which transport takes place on support plates or on a bath of molten metal (for example, U.S. Pat. No. 3,804,608 and U.S. Pat. No. 3,809,542 A) in order to prevent the waviness problems caused by the discontinuous contact of the green glass with the rollers. These methods generally have the disadvantage that they must be carried out in an inert atmosphere, which is complex to create and moreover results in added costs.

Transporting the green glass on support plates has the disadvantage that the side of the green glass that rests on the support plate has only limited contact with the furnace atmosphere, resulting in differences between the upper face and lower face of the ceramic article that is produced with respect to the properties thereof, for example, mechanical strength, chemical resistance, transparency and the like. Moreover, the support plates must be preheated every time they are used and they also must be continuously heated during ceramization, which leads to significant added energy expenditure and is also more time-consuming because additional process steps are required. In contrast, direct ceramizing of the green glass on rollers has the advantage that considerably less material required exclusively for conveying the green glass must be heated as well.

Supporting the green glass on a bath of molten metal, for example, on a float bath made of tin, has the disadvantage that the surfaces of the green glass that are in contact with the bath can become contaminated by components of the bath. This has a disadvantageous effect on the ceramizing process. Contamination with tin can lead, for example, to increased surface crystallization, which is undesirable with respect to the quality requirements which the glass ceramic product must meet. Moreover, in particular when a ceramizing method having high maximum temperatures is employed, the ceramization of the glass ribbon may no longer be controllable, thus rendering the process unfit for production.

It is therefore the object of the invention to provide a ceramizing method and a device for carrying out this method, which allows fast, energy-efficient ceramizing at high maximum temperatures and, at the same time, ensures a high quality of the ceramized products in terms of mechanical, chemical or transparency-related properties and, in particular, in terms of the flatness of the product. Moreover, it should be possible to utilize the method continuously.

This object is achieved by the subject matter of the independent claims. Advantageous embodiments and refinements are disclosed in the dependent claims.

The method according to the invention accordingly provides for the ceramization of green glass, with the green glass being conveyed and/or supported directly on rollers, at least during volume crystallization. The method can be carried out at a high ceramization rate that allows at least one region of the green glass, after the forming operation has been completed for this region, to be ceramized in a process that includes ceramization all the way to completion of the cooling step of the ceramized region within only 0.5 to 4 hours. The period in which the green glass is exposed to maximum temperatures during volume crystallization comprises only 5 to 60 minutes, with the maximum temperatures ranging between 750 and 1250° C. This further increases the energy efficiency that is achieved by processing without a support plate. The method is continuous in that the ceramization is carried out while the product passes through the furnace. The invention can, in general, be employed for both the ceramization of individual plates and for a continuous ribbon. Accordingly, in particular green glass in the form of a continuous green glass ribbon is, or individual green glass plates, are used as the starting substrate. In the case of a green glass ribbon, the ceramization is preferably followed by a singulation or a separation into individual plates.

A green glass as defined by the invention is generally a starting substrate which is converted into a glass ceramic material that is structurally different from the material of the starting substrate by means of ceramizing using the method according to the invention. This glass is preferably an amorphous glass. However, the green glass can also already contain crystal phases. In addition, the use of the invention on glass ceramics as the starting substrates, or green glass, and carrying out a ceramization in the form of a recrystallization has been considered. The transformation of a high-quartz mixed-crystal phase of the starting substrate into a keatite mixed-crystal phase shall be mentioned as an example here.

At least shortly prior to and during volume crystallization, the temperatures of the upper and lower faces of the ceramizing segment of the green glass are continuously measured and the heating is controlled using this information based on target values.

Shortly prior to and at least at the start of volume crystallization, the viscosity of the green glass to be ceramized can range, at least intermittently, between $10^7$ and $10^{11}$ dPa·s. Given this low viscosity, the conveying device is subject to high requirements for the conveyance, at least during the time segment in which the viscosity reaches minimum values. If too far a distance between rollers is selected, the advancing rate is too low or the temperature too high, the glass ribbon to be ceramized, or the plate to be ceramized, can "sag" between the supporting rollers, resulting in undesirable waviness of the end product. In extreme cases, it is even possible for the glass ribbon to break between individual rollers, which would disrupt the entire continuous production process. After a majority of the crystallization process has taken place within a few minutes, the viscosity rapidly increases again in the partially ceramized green glass due to the formation of the crystals. Deformations that developed at the time the viscosity was the lowest, which is to say immediately before or at the start of crystallization, are virtually frozen.

At least in the region of the volume crystallization, the distance between the rollers of the conveying device is therefore a function of the advancing rate of the glass ribbon and the temperature at this time, which in turn determines the lowest viscosity of the green glass just prior to the start of volume crystallization. For this reason, the advancing rate of the glass ribbon should range between 0.2 and 10 m/min., preferably between 0.5 and 5 m/min., at the lowest viscosities of $10^7$ to $10^{11}$ Pa·s. Rapid advancing rates lower the risk that the low-viscosity material may sag.

As an alternative to establishing the roller distances by means of the advancing rate, temperature and viscosity of the green glass, the distance $X_{Roller}$ between the roller axes can also be estimated using the formula $$x_{Roller}^5 \leq 360 * (R_a * t_{Pane}^2)/(\rho * g) * v * \eta$$

where $R_a$ is the maximum glass deflection, $t_{Pane}$ is the glass thickness, $\rho$ the glass density, g the acceleration due to gravity, v the advancing rate and $\eta$ the minimum viscosity of the glass over the course of ceramization on the rollers. Thus, if a maximum value of the waviness is predefined in accordance with the parameter $R_a$, this relationship can be used to determine the maximum roller distance as a function of the advancing rate and the minimum viscosity that is reached during ceramizing. At a particular roller distance, the relationship can also be maintained by appropriately controlling at least one of the parameters consisting of the advancing rate or temperature, or minimum viscosity of the glass. Accordingly, in a refinement of the invention, the measuring and control unit is equipped to control the temperature and/or the advancing rate so that the above relationship is met. Good values for $R_a$ are below 100 micrometers, as will be described in more detail hereafter.

Here, a pressing roller as is known from U.S. Patent Application No. 2005/016214 can also be omitted without resulting in increased waviness.

The method according to the invention has several advantages over the prior art. First, this type of ceramization is fundamentally suited for converting glass ribbons having infinite lengths and widths. The glass ribbon length and width are solely limited by the existing technical options, such as the available installations and the components thereof (heating elements, roller lengths, and the like). However, secondly, it is also possible to ceramize individual green glass plates.

Moreover, the ceramization is not carried out on support plates but rather on a roller system. The energy-intensive heating of the support plates, which is used exclusively for conveying the green glass and is incurred anew each time the plates are introduced into the furnace, is not necessary. In contrast, a roller system is fixedly installed and must be heated only once when heating the furnace. Subsequently, only the energy that is required to maintain the temperature of the heated rollers must be supplied. In total, at least 50% by weight of the mass that must be heated to ceramization temperatures during ceramizing is thus saved, which entails considerable time savings, and notably cost savings. Moreover, it is possible to save the process step of "heating the support plates" and to save at least one installation. In summary, this results in significant, energy, time, and thus cost, savings.

The method according to the invention also exhibits clear advantages over ceramizing on a bath of molten metal, for example, a float bath made of tin. For example, no special atmosphere is required during ceramizing, which entails considerable cost advantages. Moreover, contamination of the side of the green glass that rests on the float bath is avoided. Particularly at the high maximum temperatures that are provided according to the invention, such a contamination can result in ceramization that is difficult to control, or can no longer be controlled at all, because the crystallization process takes place exothermically. Supporting the green glass on a float bath would thus be associated with great difficulties, at least with respect to process control, or would make such control even impossible, with fast ceramization.

According to a refinement of the invention, the rollers of the conveying device are disposed at a distance from one another so that, at a predefined advancing rate and a viscosity of the region of the green glass to be ceramized that is induced by the prevailing temperatures and the degree of ceramization, only minor waviness of the product develops. This minor waviness is no more than 100 μm, preferably even no more than 50 μm, measured as the difference in height between a wave valley and an adjoining wave peak, the waviness being periodic and having a preferred direction. The preferred direction is determined by the running direction of the plate, or the ribbon, on the rollers. Waviness that is only minor and preferably imperceptible or almost imperceptible to the eye allows the products that are produced using this method to be employed in fields which require a planar surface, which is to say, for example, as a window, façade panel or glass ceramic cooktop. Products thus produced are generally suited as replacements for ceramics and high-performance ceramics. High-performance ceramics are employed wherever the requirements are high for at least one of the factors consisting of thermal loading, wear resistance, thermal shock resistance and electric insulation capability. Fields of use include bearing elements, sealing elements, piston and valve elements, nozzles, and stamping and molding tools.

In principle, waviness that is clearly perceptible to the eye is composed of two parameters. For one, the amplitude, as described above, is decisive. The visibility of this amplitude, however, is directly related to the wavelength of the waviness. In generalized terms, one can say that the greater the wavelength of the waviness, the greater the amplitude of the waviness can be without the same being perceived by the eye. Waviness that is visible to the eye exists, for example, at amplitudes greater than 50 µm in conjunction with wavelengths of less than 135 mm. Such waviness is no longer acceptable if flat articles are required.

Surprisingly, however, a certain level of minimum waviness of the article produced has proven to be extremely useful. A minimum waviness at which the difference in height between a wave valley and an adjoining wave peak is at least 1 µm, preferably at least 5 µm, generally facilitates the handling of the articles produced, in particular if larger plates are involved. Glass ceramic articles, in general, respond with great sensitivity to any damage to the surfaces thereof, which leads to losses in the mechanical properties, such as the strength thereof, but also lower the chemical resistance thereof.

Minor waviness, in particular if the waviness has a preferred direction as is the case according to the invention, limits the surface area and thus the regions that can become scratched when the article is handled carelessly, during packaging, for example. Advantageously, for example, glass ceramic plates can be stacked on top of one another so that only point contacts exist between the individual plates due to the preferred direction of the minimum waviness. The risk of the glass ceramic plates becoming scratched is thus considerably reduced.

Periodic waviness according to the invention should be understood as several wave valleys, each followed by a wave peak, following one another. A wave peak and a subsequent wave valley are thus considered to be a cycle. The term periodic thus means, in the broadest sense, "cyclic;" the cyclicity need not be regular. The waviness spacing of an article, however, preferably does not deviate from an average value by more than 30%.

A preferred direction in the waviness describes the fact that long-drawn wave crests and long-drawn wave valleys form. The term preferred direction is used within the context of the present invention primarily to highlight a contrast to large-surface-area elevations or indentations that have no preferred direction and can run over the entire glass ceramic article. These individual structures, which may encompass the entire glass ceramic article, are not excluded according to the invention. However, they are superimposed with the considerably shorter-spaced periodic waviness.

According to a preferred refinement of the invention, the wavelengths of the waviness range between 50 and 500 mm, preferably between 60 and 200 mm.

Apart from smooth surfaces on both sides of a glass ceramic article according to the invention in the form of a plate, this method can also be employed to produce pebbled surfaces. The surface structuring is then carried out during, or immediately following, the forming process of the green glass. However, pebbled surfaces are frequently generated exclusively in order to locally limit damaging and moisture-reducing influences to the pebble tips. These damaging influences thus almost never achieve a critical level, which is to say the strength property of the glass ceramic is not negatively influenced, as long as the damage only affects the pebble tips. Undesired deformations of the ceramizing green glass can primarily be attributed to temperature gradients in the vertical direction. They initiate temporarily asymmetrical shrinkages of the upper and lower faces of the material to be ceramized, with the increases in viscosity of the upper and lower faces also occurring at a temporal offset from one another. Because the progressing crystallization also leads to a steep increase in the viscosity, large deformations are subsequently almost impossible to rectify. In most instances, the only option is a post-treatment of the ceramized article using material-removing methods; however, these methods disadvantageously damage the surface and additionally are very cost-intensive. Articles produced in this way have considerably worse mechanical and chemical properties than articles that require no post-treatment.

In summary, it can be stated that pebbled surfaces can also be produced using the method according to the invention.

In addition to smooth and pebbled surfaces, the method according to the invention can be used to produce transparent, translucent, uncolored and volume-colored, as well as opaque glass ceramic articles. Transparent glass ceramic articles are generally characterized by a main crystal phase made of high-quartz mixed crystals, and translucent to opaque glass ceramics are generally characterized by a main crystal phase made of keatite mixed crystals. Within the context of the present invention, a main crystal phase shall be understood to mean a crystal content of at least 60% in the total crystal content.

In a refinement of the invention, the generation of a flat or planar surface is supported by as high a temperature homogeneity as possible within the green glass ribbon to be ceramized. According to this refinement of the invention, the temperature over the width of the green glass $T_y$ to be ceramized in the furnace does not deviate by more than −5° C. to +5° C. from a predefined target temperature T. In other words, in particular just to prior to and during volume crystallization, and thus in general during the period of the lowest viscosity of the ceramizing green glass, the temperature difference over the width of the green glass to be ceramized in the furnace is less than 10° C., preferably less than 5° C., and still more preferably less than 3° C.

For this reason, advantageously the temperature homogeneity between the upper and lower faces of the green glass to be ceramized is also controlled so that the temperature difference between the upper and lower faces of the glass in the furnace ranges between −0.5° C. and +1° C. This control is important, in particular, with respect to the flattest or most planar generation possible of the ceramized article and to avoid ceramization stress because varying temperatures can result in varying volume expansions of the hot material. In addition to the generation of waviness, varying volume expansions again favor disadvantageous or even unacceptable buckling of the plates, such as upward arching of the corners thereof or buckling of the center region thereof, for example.

Because the crystallization process takes place exothermically and comparatively high maximum temperatures for fast ceramizing are employed according to the invention, ensuring a balanced temperature distribution over the ceramizing green glass is not a trivial matter. Under these circumstances, controlled ceramizing is only possible by means of a heating device that generates very uniform heat distribution and extremely powerful temperature sensors, which report temperature changes resulting from exothermic process to a measuring and control unit within seconds. This measuring and control unit must then adapt the temperature adjustment within the shortest time possible, because otherwise the control over the degree of ceramizing, and hence the quality of the article, is lost. For this purpose, a device for carrying out the method provides for a measuring and control apparatus that controls the temperature adjustment based on current measurement values and target specifications.

According to the invention, the measuring and control apparatus is generally able to respond to changed conditions within 10 seconds, and in the most favorable cases even within one second.

Such a measuring and control apparatus can be composed, for example, of temperature sensors connected to a computer and a temperature control apparatus also connected to the computer.

The heating device, which generates a very homogeneous heat distribution, can be composed, for example, of heating elements known to a person skilled in the art disposed at regular intervals relative to one another that preferably project at least 10 cm beyond the edges of the green glass to be ceramized. The projection of the heating elements beyond the edges of the green glass is useful so as to also achieve homogeneous temperature distribution in the edge region of the green glass.

Moreover, it is useful to design the wall of the furnace region in which volume ceramization takes place to be heat-conducting in order to achieve a fast temperature change, by which the ceramization of the green glass can be effectively controlled. This may be surprising because, in general, the best possible heat insulation is desired for furnaces so as to reduce heating costs. In this case, good heat insulation of at least the chamber, or the respective furnace segment, in which volume crystallization takes place is counterproductive. Quickly responsive temperature control requires heat to be dissipated relatively quickly from the chamber, or the respective furnace segment. Thus, according to a particularly preferred refinement of the invention, a chamber that has little or even no insulation is provided for carrying out volume crystallization.

According to a further refinement of the invention, the green glass to be ceramized and/or the ceramized product has a composition in the following range:

| | |
|---|---|
| 60-73.0 wt. % | $SiO_2$, |
| 15-25.0 wt. % | $Al_2O_3$, |
| 2.0-5.0 wt. % | $Li_2O$, |
| 0-5.0 wt. % | $CaO + SrO + BaO$, |
| 0-5.0 wt. % | $TiO_2$, |
| 0-5.0 wt. % | $ZrO_2$, |
| 0-4.0 wt. % | $ZnO$ |
| 0-3.0 wt. % | $Sb_2O_3$, |
| 0-3.0 wt. % | $MgO$, |
| 0-3.0 wt. % | $SnO_2$ |
| 0-2.0 wt. % | $P_2O_5$, |
| 0-1.5 wt. % | $As_2O_3$, |
| 0-1.2 wt. % | $Na_2O + K_2O$, with the respective contents preferably being within the ranges provided below, |
| 0-1.0 wt. % | $Na_2O$, |
| 0-0.5 wt. % | $K_2O$. |

In general, however, it should be noted that the method can be applied to a broad range of compositions. It is also possible, for example, to produce glass ceramic composition from remelt phases. Here, components of the composition range described above can also be entirely absent.

In one refinement of the method, the volume crystallization and an optional maturing phase at a maximum temperature are followed by fast cooling to below 600° C., with the cooling rate being at least 5° C./min., preferably between 10 and 20° C./min., at least intermittently.

The interaction with the atmosphere prevailing in the furnace during volume crystallization or ceramization can take place without local restrictions and in a completely unimpaired fashion in the method outlined so far. This advantageously results in the generation of a substantially vitreous edge region that completely, or at least partially, surrounds a substantially crystalline inside region. The thickness of the vitreous layer, or of the vitreous edge region, typically ranges between 50 and 5000 nanometers, in most instances between 250 and 3000, and preferably between 300 and 1500 nanometers.

The substantially vitreous edge region, or the substantially vitreous edge layer, comprises no more than 10% by weight of crystals, which is to say at least 90% by weight of the edge region is made of a vitreous matrix. The vitreous edge region still more preferably comprises less than 1% by weight of crystals. In contrast, the content of crystals in the substantially crystalline inside region of the glass ceramic article is at least 50% by weight, preferably at least 80% by weight, and still more preferably at least 90% by weight. The detection method employed here is X-ray diffractometry.

In transparent glass ceramic articles, such a vitreous edge region increases the light transmission or transparency by up to 1%, in absolute terms, compared to a glass ceramic article that has no vitreous edge region. But even translucent or opaque glass ceramics benefit from the generation of a vitreous layer by having improved mechanical strength and chemical resistance.

In particular the option of atmospheric contact that acts on both sides, as that which is offered by the roller conveying system on which direct ceramizing also takes place, has proven to be particularly advantageous for the generation of such a vitreous edge region. The support on rollers also causes the lower face of the green glass that rests on the rollers to have almost continuous contact with the atmosphere. For this reason, a uniform vitreous edge region is generated here as well, so that a thickness tolerance along the respective surface area of the upper or lower face of preferably no more than 10% of the mean layer thickness is ensured. Such a homogeneous layer thickness of the vitreous edge region cannot be achieved during the ceramization on support plates or on a Sn float bath, in particular on the lower face of the ceramized product.

According to a preferred refinement of the invention, the roller surfaces preferably contain at least one of the materials comprising silicon carbide, silicon oxide, corundum or mixtures of the system of fused/sintered mullite-sillimantin, boron carbide and boron nitride. These materials have sufficient heat stability, and glass ceramics produced on such rollers exhibit surprisingly similar damage-free and defect-free surfaces as glass ceramics of the same type that were produced on support plates, the surfaces of which were specially conditioned for this purpose.

In order to ensure good heat supply from beneath, preferably a ratio between the roller diameter $d_{Roller}$ and roller length $l_{Roller}$ of $0.25 < d_{Roller}/l_{Roller} < 0.9$ should be maintained. It is particularly preferred for this ratio to be 0.5.

According to a further advantageous embodiment of the invention, the green glass plates are applied or placed obliquely on the conveying apparatus, which is to say the rollers, when ceramizing individual green glass plates, so that one of the corners leads the remaining plate. By using such an arrangement, the starting or end region of a plate that is not supported by rollers and has decreased viscosity can be reduced as compared to a "straight" conventional arrangement of the plate. This also reduces the unsupported weight component of the plate during the transition between two adjoining rollers. This arrangement is intended to help prevent the front edge of the plate in the advancing direction, which may droop due to the decreased viscosity and the unsupported dead weight, from striking against the subsequent roller and becoming damaged and deformed in the process. At the same time, the end region of the plate undergoes less downward bending, because the unsupported mass during the transition between two plates is reduced here as well.

A device for carrying out the method according to the invention preferably comprises an apparatus that provides the green glass to be ceramized. This is, in particular, a device for melting and forming the green glass, which is connected directly upstream of the ceramizing device according to the invention. It is also possible, however, for a suitable feeding system to continuously supply previously singulated green glass plates.

Moreover, a continuous furnace is provided for ceramizing the green glass, with the continuous furnace being equipped to carry out the entire ceramization process within 0.5 to 4 hours. At least one chamber of the continuous furnace is equipped for volume crystallization of the green glass and comprises apparatuses that allow separate heating of an upper face and a lower face of the green glass to be ceramized to 750 to 1250° C. Moreover, this region of the furnace comprises a measuring and control apparatus, which can not only assume the control of the entire device, but above all is also equipped to detect temperature changes on the upper and lower faces of the ceramizing green glass within just a few seconds and to adapt the temperature adjustment of the furnace accordingly, which in the most favorable case is done within one second. This fast response time is necessary to ensure effective control over the exothermic ceramization process.

The continuous furnace additionally comprises a conveying apparatus, which comprises rollers for conveying and/or supporting the green glass, at least in the furnace region in which volume crystallization takes place; an advancing rate of between 0.2 and 10 m/min., and preferably between 0.5 and 5 m/min., can be implemented.

According to a refinement of the invention, the roller axes are disposed from each other at a distance of at least the diameter of the rollers plus 0.2 cm and of no more than the diameter of the rollers plus 10 cm, at least in the region in which volume crystallization or ceramization takes place. This enables a good temperature exchange on the lower faces of the plates, and thus also good control of the temperature.

Moreover, rollers that are disposed next to one another at identical intervals can boost periodically occurring waviness in the end product, or aperiodic distances between the roller centers can reduce the waviness of the end product. According to an advantageous refinement of the invention, the conveying unit thus comprises rollers that are disposed at variable or aperiodic distances, with the distances and the diameters of the rollers being dimensioned so as to prevent "sagging" of the green glass ribbon to be ceramized.

The rollers can also be disposed such that the distances between rollers do not repeat at regular intervals. The term "aperiodic arrangement", however, also includes arrangements in which certain groups of roller distances repeat. Such an arrangement would exist, for example, with a roller distance sequence of 8 cm, 12 cm, 8 cm, 12 cm, and so forth.

According to a further refinement of the invention, the advancing rate can be increased during ceramization. For this purpose, the rollers can run, or be driven, successively faster along the advancing direction. The accelerated advancement effects a drawing of the plate, thus preventing or correcting the sagging of the plate between the rollers.

Glass ceramic articles that can be produced by means of the method according to the invention can be used as panes, in particular vehicle windows, fireplace windows or cooktops, as cookware in general, or for façade claddings. However, they can, in general, also be used as replacements for high-performance ceramics.

BRIEF DESCRIPTION OF THE DRAWINGS

The invention will be described in more detail hereafter based on exemplary embodiments. Identical reference characters in the different figures denote identical or similar characteristics. In the drawings.

DETAILED DESCRIPTION

Figure 1A:
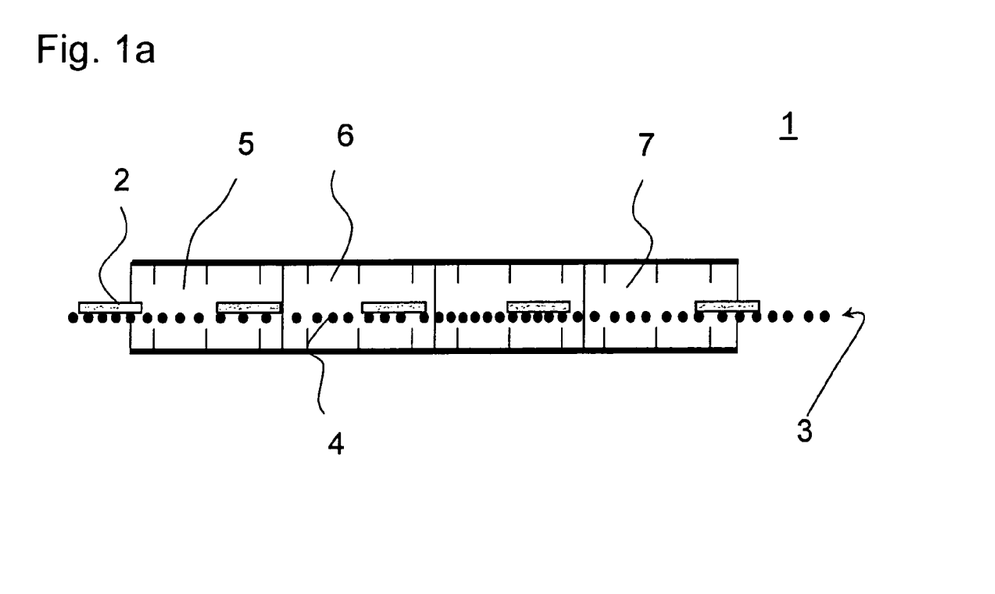
FIG. 1a: is a schematic view of a typical device by which the method according to the invention can be carried out.
Figure 1B:
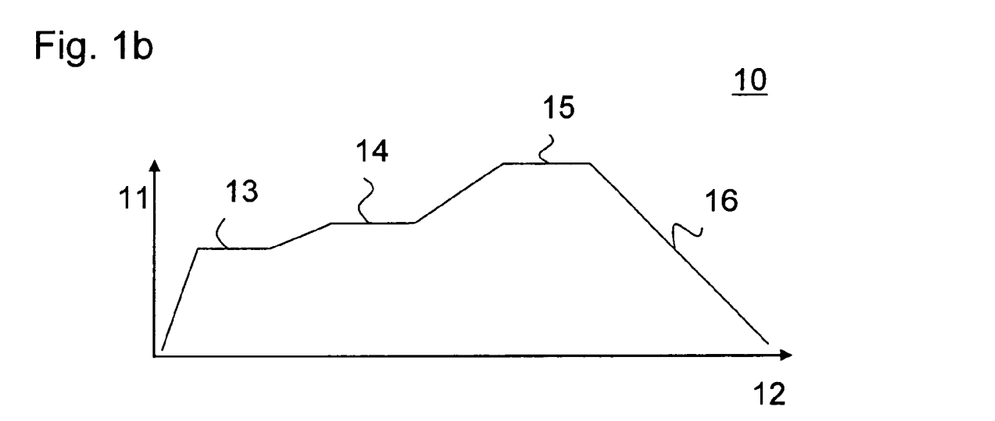
FIG. 1b: shows a typical temperature-time profile of a method according to the invention, FIGS. 2a, b: shows the deformation in three different locations of a ceramizing plate during conveyance over a roller system with non-varying viscosity.

FIG. 1a schematically shows a typical device 1, and FIG. 1b shows a related typical, exemplary temperature-time profile 10, by means of which a ceramization method according to the invention can be carried out. The method according to the invention for continuously ceramizing green glass 2 is characterized by ceramization directly on a roller conveying system 3, with very short ceramization durations of only 0.5 to 4 hours being provided for. Such a combination for the production of high-quality products is only possible if the parameters that influence the flatness of the product are determined within a very precise range and, in particular, are tailored to one another. The temperature adjustment, for example, decisively influences the viscosity of the ceramizing green glass 2. In the example shown in FIG. 1a, thermocouples 8 project into the furnace in order to control the temperature. Thermocouples are disposed both above and below the green glass in order to produce the lowest temperature difference possible between the upper and lower faces of the green glass. In connection with the thickness of the green glass, the viscosity determines how large the gaps between the individual rollers 4 of the conveying system 3 can be, so that the low-viscosity green glass 2 does not sag between the individual rollers 4 and no undesirable waviness is generated in the end product.

The roller-type furnace 1 shown in FIG. 1a is only intended as a possible example of a device by which the method according to the invention can be carried out, which within the proper meaning refers only to the period directly prior to volume crystallization and the period of volume crystallization as such. Typically, nucleation takes place in one or more chambers 5, volume crystallization takes place in two to three chambers 6, while four to six chambers 7 are used for cooling the ceramized green glass 2 at the end of the method.

The temperature-time profile 10 shown in FIG. 1b is likewise only intended as a schematic example, for which reason no absolute values are indicated. The temperature 11 and time 12 are to be understood to be a function of a special method, which is not the topic of this application, but is only incorporated herein in the form of limiting framework parameters, such as the total time or maximum temperatures. Moreover, the individual phases of a typical ceramization program are shown, which is to say nucleation 13, volume crystallization 14, maturing phase 15 and cooling 16. The heating phase at the beginning of the process is generally not required if a glass ribbon is ceramized immediately following the hot-forming process and if sufficient residual heat is present.

The influence of individual parameters such as viscosity, roller distance, advancing rate and the like, directly prior to and during volume crystallization 14, on the flatness, and thus the quality, of a glass ceramic article will be described in the following based on examples. With respect to ceramization taking place directly on a roller conveying system 3, the flatness or waviness of the glass ceramic article generated is an essential feature of the invention.

Figure 2A:
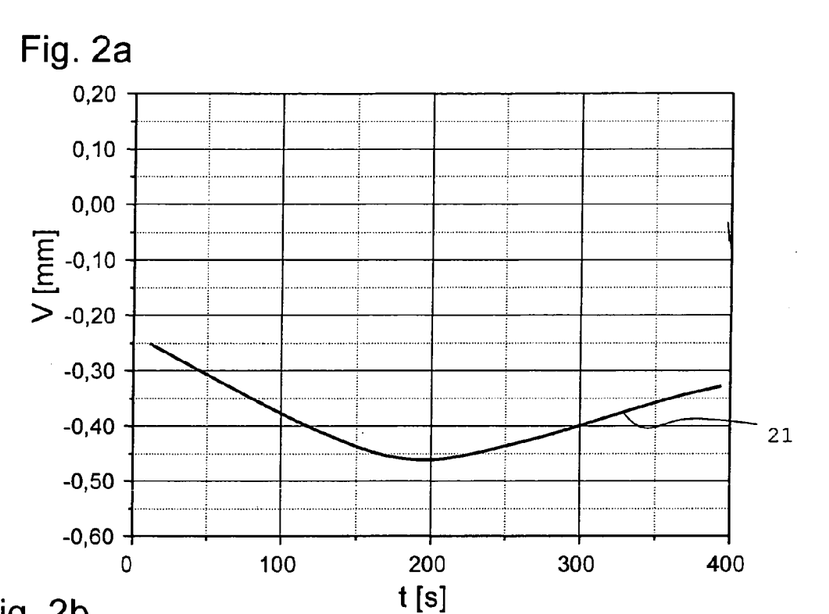
Figure 2B:
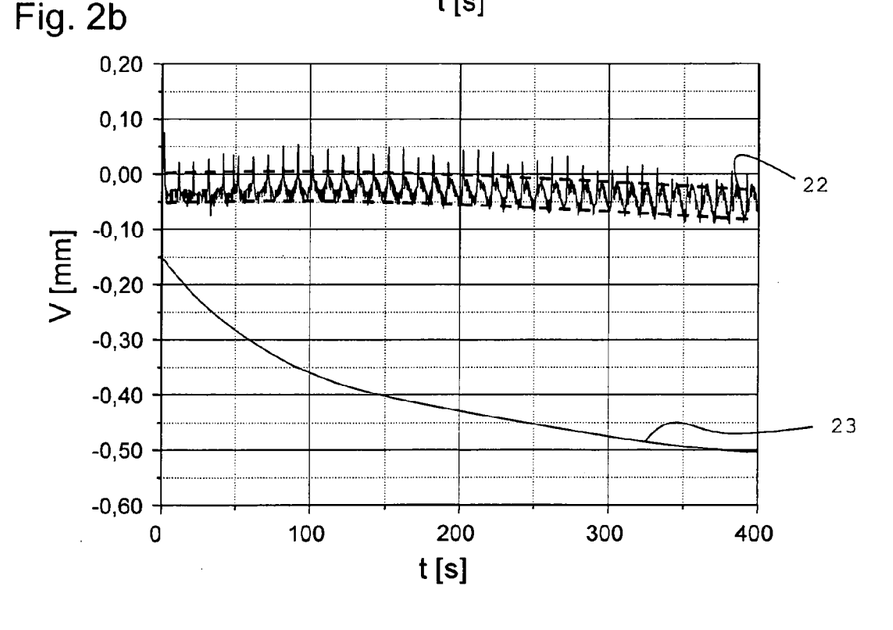

FIGS. 2a and 2b show the deformation (deviation from a starting value) of a ceramizing green glass ribbon 2 in the shape of a long pane that is conveyed by a roller system 3, shown as a function of the time t in seconds. The deformation V is indicated in millimeters. The deformation in relation to the time is shown based on three points selected by way of example. Point 1 denotes a location at the start of the plate, point 2 denotes a location at the end of the plate, and point 3 denotes a location in the center of the plate.

The conveyed pane is 5 m long and 4 mm thick. The viscosity of the ribbon is approximately $10^9$ Pa·s and does not change over time. The rollers of the conveying system have a diameter of 5 cm and are disposed at regular intervals between the roller centers of 10 cm. The advancing rate is 60 cm/min.

The curves 21, 22 and 23 in FIGS. 2a and 2b depict the deformation of three exemplary points on a glass ribbon in relation to the time. For clarity purposes, curve 21 in FIG. 2a and curve 23 in FIG. 2b show only the envelopes of the oscillating lines.

FIG. 2a shows the envelope 21 of the movement curve of a point that is located at the front, or at the start of the plate, in the conveying direction of the ribbon.

After approximately 200 seconds, the envelope 21 exhibits a maximum amplitude, which then slightly decreases again toward the end of the period. On an overall basis, after approximately half the time, a tendency can be observed toward an upward movement of this center region of the ribbon, so that this region of the ribbon again has a lower degree of waviness after 400 seconds.

The curve 22 in FIG. 2b shows a detailed plotting of the movement of a point located in the center of the ribbon, with each upward trend of the curve 22 corresponding to the rolling of this point onto a roller 3, and each downward trend denoting the movement of the ribbon in the location of the point between two adjoining rollers. The downward trend thus traces how the ribbon moves downward when "rolling off" a roller on the path to the adjoining roller due to the low viscosity and the force of gravity. The upper and lower envelopes of the curve 22 are each shown as dotted lines.

The envelope of the curve 22 shows that the amplitude of the center part of the ribbon is 50 μm after 400 seconds, which is to say that, under these conditions, the ribbon has a maximum difference in height from a wave peak to an adjoining wave valley of 50 μm.

FIG. 2b moreover shows the envelope 23 of the movement curve of point 2, which is to say that a point that is located at the back in the movement direction of the ribbon. Again, for the benefit of clarity, a detailed view of the entire curve progression has been omitted. The envelope 23 shows a steady rise in the amplitude, and thus in the waviness, at the rear end of the ribbon over the course of time. Toward the end of the period shown, however, the progression of the envelope increasingly approaches a constant progression. The maximum difference in height between a wave peak and an adjoining wave valley is approximately 450 μm at the end of the glass ribbon under the aforementioned conditions.

Figure 3:
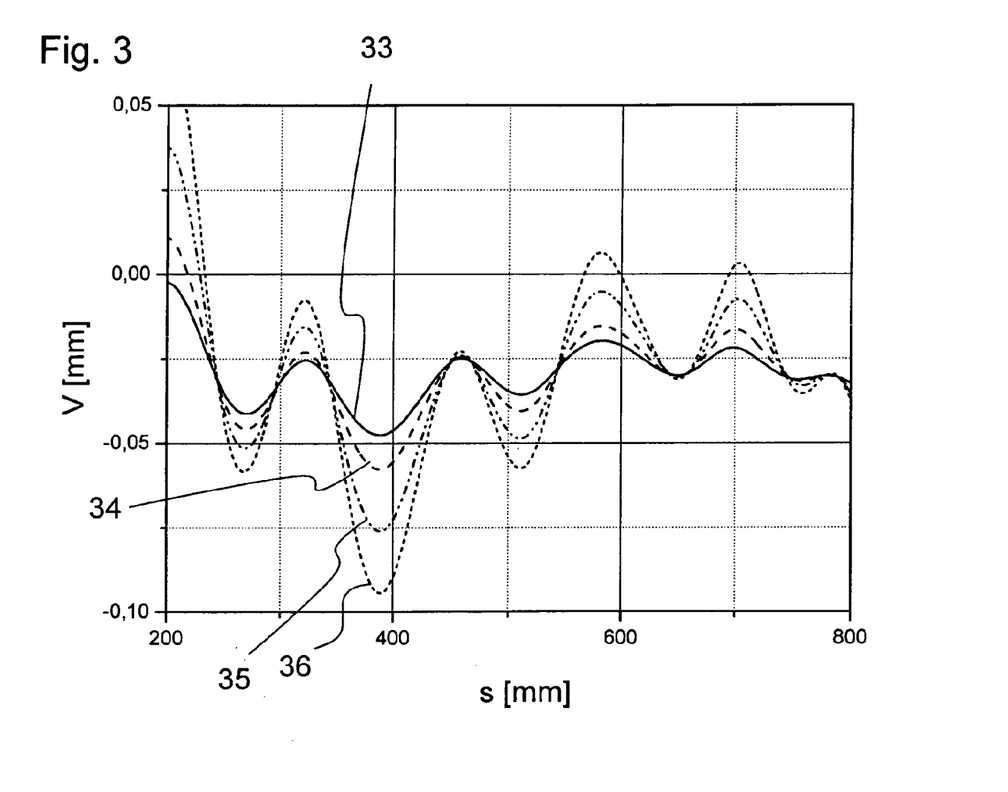
FIG. 3: shows the influence of various minimum viscosities directly prior to and at the start of volume crystallization on the deformation of a ceramized article.

FIG. 3 shows the influence of varying minimum viscosities directly prior to and at the start of volume crystallization on the deformation of a ceramized article. The graph shows the deformation of the article on the y-axis as a function of the plate length, which is plotted along the x-axis. The unit of both the x-axis and of the y-axis is millimeters. Zero millimeters on the x-axis correspond to the rear end of the plate in the conveying direction, 1000 mm corresponds to the front edge of the plate, as viewed in the conveying direction.

The curves 33, 34, 35 and 36 show identical plates that were ceramized under identical conditions, with only the viscosities being different. The plate length is 1 m, the plate thickness is 4 mm, the roller diameter 50 mm, the roller distance 100 mm and the advancing rate is 60 cm/min. The viscosities of the plates shown in the curves are as follows:

| | |
|---|---|
| Curve 33 | $10^{9.6}$ Pa · s |
| Curve 34 | $10^{9.4}$ Pa · s |
| Curve 35 | $10^{9.2}$ Pa · s |
| Curve 36 | $10^{9.0}$ Pa · s. |

The deformation curves 33, 34, 35, 36 show that, with otherwise identical parameters, the deformation increases the lower the viscosity of the green glass during the phase of the lowest viscosity. The ratio between the viscosity and the waviness, which can be derived from this data, is linear and follows from the relationship $$R_a/R_{a1} = \eta/\eta_1,$$

where $R_a$ denotes the waviness at a first viscosity $\eta$ and $R_{a1}$ denotes the waviness at a second viscosity $\eta_1$.

Figure 4:
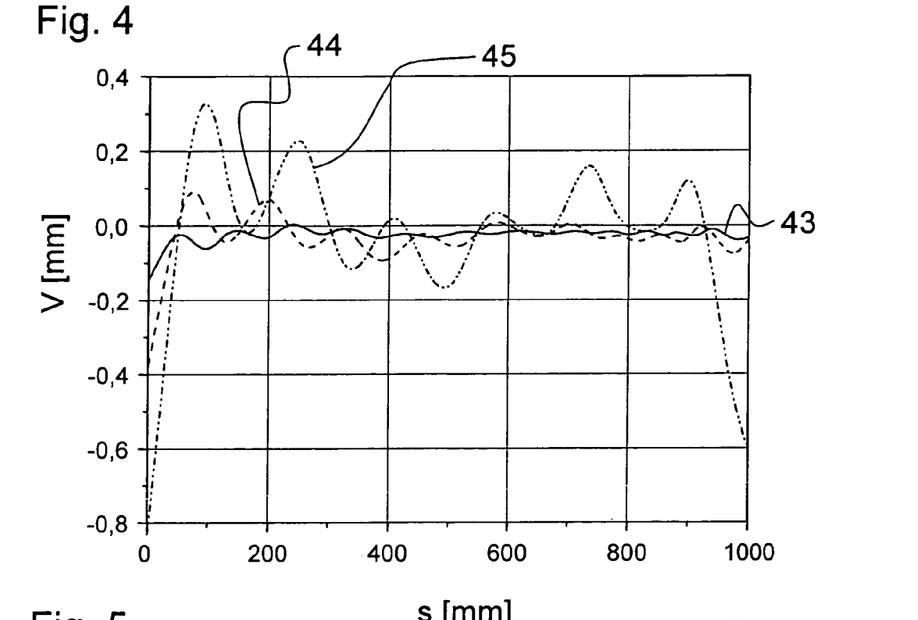
FIG. 4: shows the waviness of a ceramizing green glass plate as a function of the roller distance, plotted in relation to the longitudinal plate position.

FIG. 4 shows the waviness of a ceramizing green glass plate 2 as a function of the roller distance, plotted in relation to the plate length. The roller distance refers to the distance between the roller centers of adjoining rollers.

In all cases shown, the ceramized plate is 1 m long, 4 mm thick and has a viscosity of $10^{9.0}$ Pa·s. The deformation of the plate is plotted on the y-axis, and the plate length is plotted along the x-axis, both in millimeters. All examples were conveyed on conveying systems having a regular or periodic roller distance. The roller distance is 50 mm in all examples.

The curve 43 depicts the deformation of a ceramized plate that was conveyed on a conveying device 3 in which the roller distance is 75 mm.

The curve 44 depicts the deformation of a ceramized plate that is generated at roller distances of 100 mm, while the curve 45 depicts the deformation that is generated at roller distances of 125 mm.

It is apparent that, under otherwise identical conditions, the roller distance strongly influences the deformation of the ceramized article. In general, small distances lead to low deformations, while large distances result in strong deformations. However, it is not only the deformation, which is to say that the amplitude of the curve, that changes with changed distances, but also the wavelength of the deformation. As the distance of the roller centers from one another increases, so does the wavelength that is generated. The strong deformations at the front and rear plate edges, which increase disproportionately as the roller distance increases (see curves 43 and 45), are particularly striking.

The relationship between the average waviness, also referred to only as waviness, of the article and the roller distance is highly non-linear. The following applies:

$$R_a/R_{a1} = (x_{Roller}/x_{Roller1})^5 * (\eta/\eta_1),$$

where $R_a$ is the quadratic mean of the deviation from an average value and denotes the average waviness in micrometers, $x_{Roller}$ denotes the distance between adjoining roller centers and $\eta$ denotes the viscosity. The additional index 1 denotes the same parameters, albeit at a different roller distance.

Under the given conditions, a roller distance of 75 mm result in an average waviness of 5.28 µm, a roller distance of 100 mm results in a waviness of 22.64 µm, and a roller distance of 125 mm results in a waviness of 73.03 µm.

According to current findings, the spacing appears to scale at a factor of 1.1 to 1.3 to the roller distance.

Figure 5:
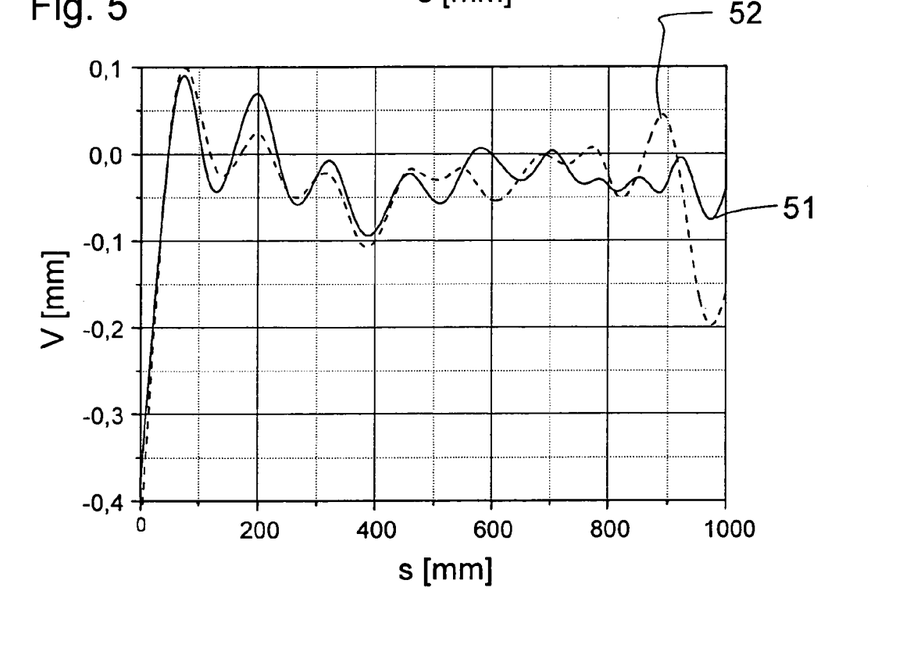
FIG. 5: shows the effects of periodic and aperiodic roller distances on the waviness of the glass ceramic article.

FIG. 5 shows the effects of periodic and aperiodic roller distances on the deformation of the glass ceramic article. The y-axis shows the deformation V and the x-axis shows the length s of the plate, both in millimeters. The same values as in FIG. 3 apply to the plate length, plate thickness, viscosity and roller diameter.

The curve 51 depicts the deformation of the plate that was ceramized on a conveying system having regular roller distances of 100 mm. The curve 52 depicts the deformation of the same plate, which was ceramized on a conveying system having irregular roller distances. The roller distances were alternately 80 and 120 mm, so that pairs form that are positioned closely together and separated from each by a larger gap.

Again, particularly strong deformation at the front (1000 m) and rear (0 mm) plate ends as compared to the center part of the plate is noticeable in both curves 51, 52.

According to the calculation using the formula for the average waviness of the article that is derived from FIG. 3, the waviness is reduced by approximately 2 µm due to rollers that are disposed at varying distances (curve 52). At the same time, the wavelength in the front region of the glass plate appears to be longer with aperiodic roller distances (curve 52) than with periodic roller distances (curve 51). The spacings conform to one another again in the rear region.

Figure 6:
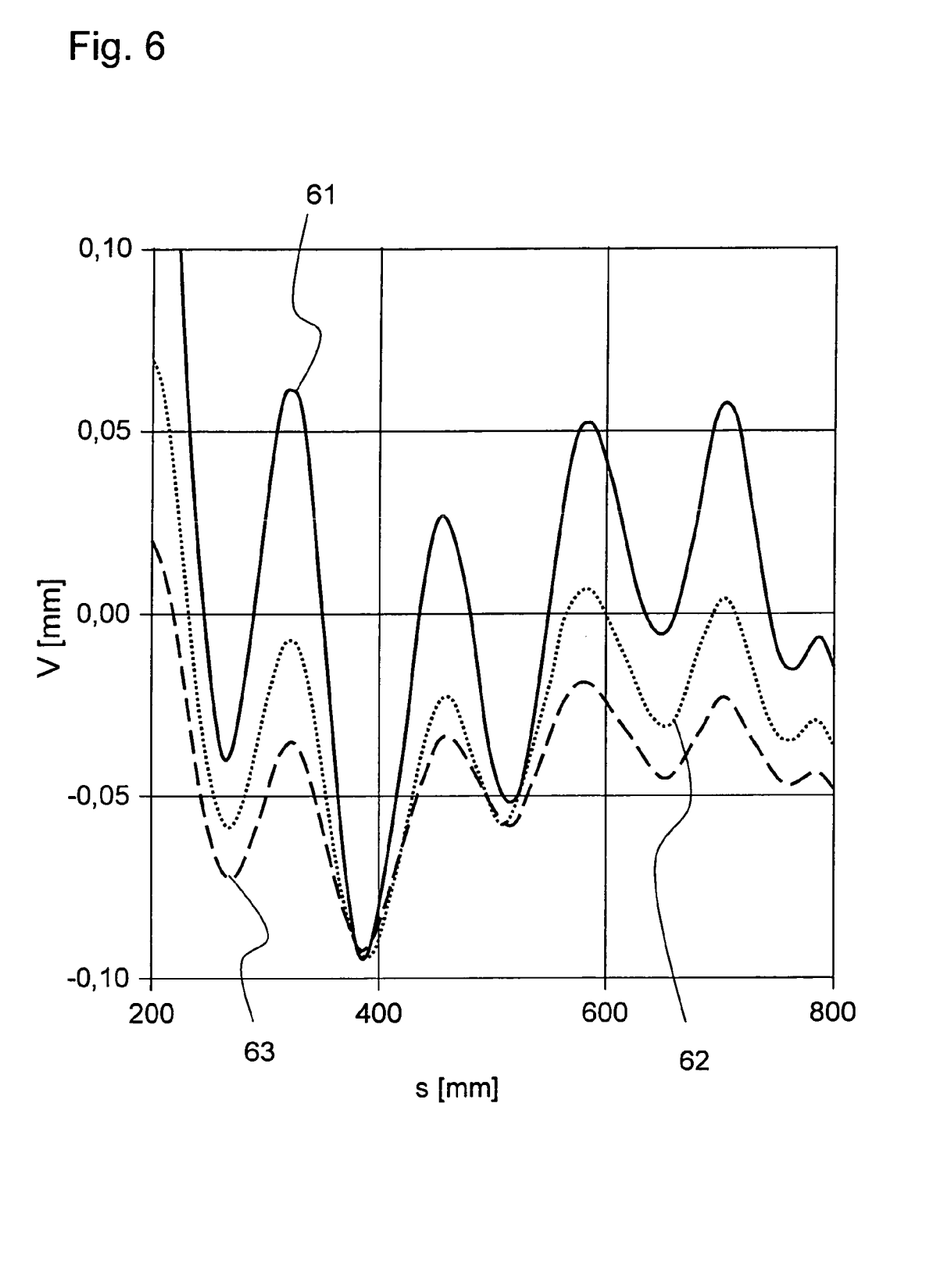
FIG. 6: shows the influence of the advancing rate on the deformation of the glass ceramic article.

FIG. 6 shows the influence of the advancing rate on the deformation V of the glass ceramic article. The deformation is again plotted in relation to the plate length s, both in millimeters.

The size of the plate, the viscosity and the roller diameter again correspond to the values provided for FIG. 3. The roller distance is 100 mm. The three curves 61, 62, 63 shown differ from one another in the advancing rate at which the plates were conveyed during ceramization. The plate represented by the curve 61 was conveyed at 30 cm/min., the plate represented by the curve 62 at 60 cm/min. and the plate shown by the curve 63 at 90 cm/min. It is clearly apparent that the advancing rate considerably influences the height of the deformation, but not the spacing thereof. The plate conveyed the fastest has the least deformation (curve 63). The relationship between the average waviness and the advancing rate is approximately linear and is derived from the following equation:

$$R_a/R_{a1} \approx (v_{Advancement}/(v_{Advancement1} + \Delta v_{Advancement1})) * (\eta/\eta_1),$$

where $R_a$ again corresponds to the average waviness, $\eta$ to the viscosity and $v_{Advancement}$ to the advancing rate. The additional index 1 denotes the same parameters, albeit for different advancing rates.

Figure 7:
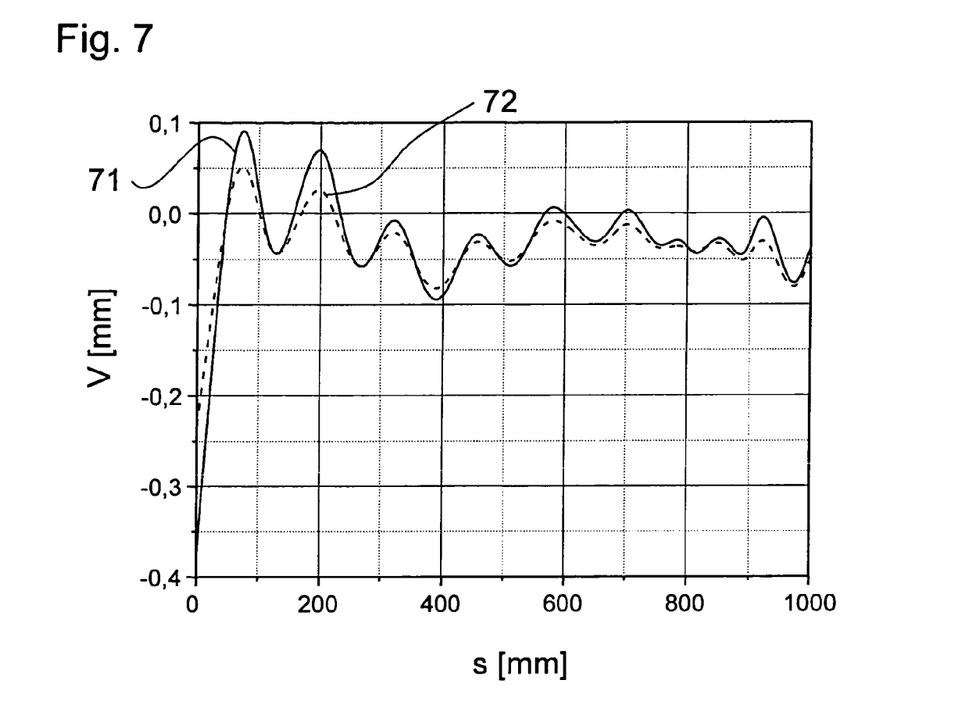
FIG. 7: shows the influence of an accelerated advancement on the deformation of the glass ceramic article.

FIG. 7 shows the influence that an accelerated advancement during ceramization has on the deformation of the known glass ceramic article. The information from FIG. 3 with respect to the plate dimensions, the viscosity and the roller diameter again apply. The roller distance is again 100 mm. The deformation V of the plate is shown on the y-axis in millimeters, and the plate length 18 is shown along the x-axis, likewise in millimeters.

The curve 71 shows the deformation of a plate that was ceramized at a constant advancing rate of 60 cm/min., while the curve 72 shows the deformation of a plate that was ceramized at an increasing advancing rate. The advancing rate is a constant 60 cm/min. over the first meter of the 5-meter-long conveying device. Over the remaining 4 m, the advancing rate increases continuously to 120 cm/min. The plate is thus uniformly accelerated.

The comparison of the deformation curves 71 and 72 shows that an acceleration of the advancement reduces the deformation of the plate, in particular with respect to the amplitude. However, the acceleration of the advancement appears to have little or no influence on the spacing of the deformation.

Figure 8:
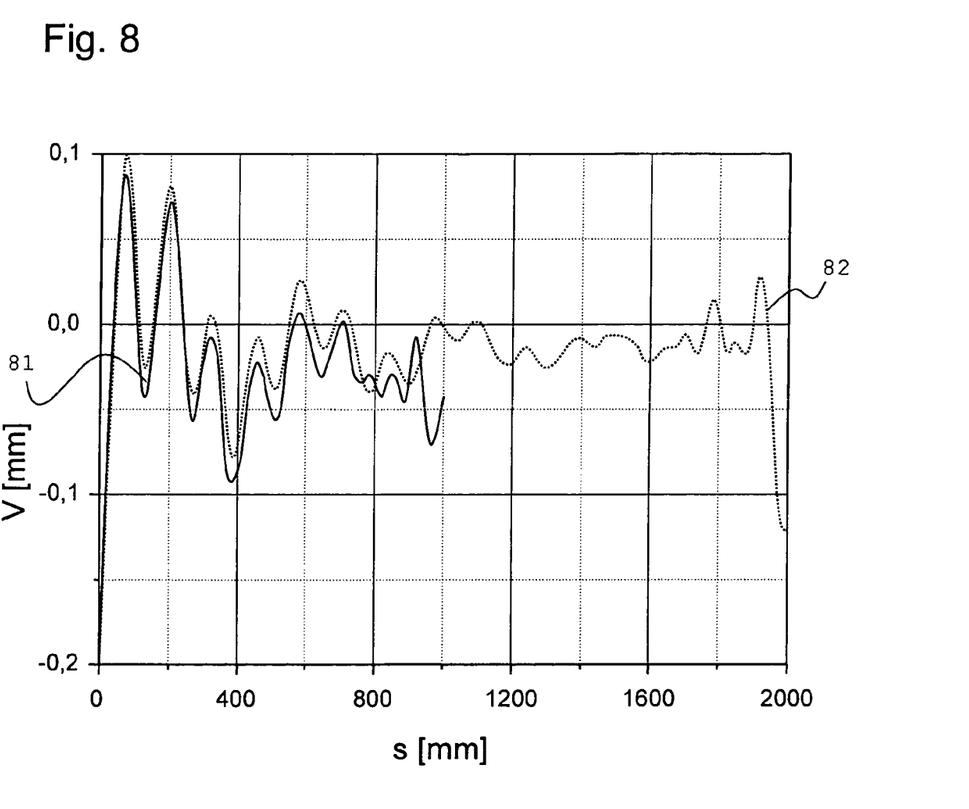
FIG. 8: shows the influence of the length of the green glass to be ceramized on the waviness of the ceramized article.

FIG. 8 depicts the influence of the length of the green glass to be ceramized on the waviness of the ceramized article. Apart from the length of the plates 18, all parameters such as plate thickness, roller distance, roller diameter, viscosity and advancing rate are identical to and correspond to the values indicated in the description of FIG. 3.

The deformation of the article is shown along the longitudinal axis. The curve 81 shows the deformation of a plate 1 m long, while the curve 82 shows that of a plate 2 m long. It is apparent that with longer articles, which shall be understood here, in particular, as a model for a glass ribbon, the center regions, which in the example here are approximately between 900 and 1800 mm, exhibit considerably lower amplitudes in the deformation. It is therefore probable that the waviness of an article ceramized in the shape of a continuous glass ribbon that is not singulated until after ceramization can be considerably reduced as compared to articles that are ceramized after being singulated. On average, the waviness over the 2-meter-long plate is lower by a factor of 2.7 to 2.8 than in the plate that is only 1 m long.

Apart from the aforementioned parameters, the thickness of the ceramizing article, of course, decisively influences the waviness that can be achieved. It goes without saying that, at low viscosities, thicker plates deform less easily than thin plates. The plate or ribbon thickness has no effect on the spacing of the deformation, only on the amplitude. The ratio that exists between the plate thickness and the waviness of the ceramized article is quadratic and can be described by the following formula:

$$R_a/R_{a1} = (t_{Pane}/t_{Pane1})^2 * (\eta/\eta_1)$$

where $t_{Pane}$ is the pane thickness. The additional index 1 denotes the same parameters, albeit for different pane thicknesses.

A formula can be derived from the different influencing factors described above that takes into account the different influencing factors on the waviness. The formula obtained is:

$$R_a/R_{a1} = \eta/\eta_1 * (x_{Roller}/x_{Roller1})^5 * (v_{Advancement}/(v_{Advancement1} + \Delta v_{Advancement1})) * (t_{Pane}/t_{Pane1})^2$$

The additional index 1 denotes the same parameters, albeit as a function of a changed parameter.

The invention claimed is:

1. A method for ceramizing green glass, in particular in the form of a continuous green glass ribbon or individual green glass plates, the method comprising:
   conveying the green glass directly on rollers at least during a volume crystallization,
   wherein the entire ceramization process of at least one region of the green glass lasts between 0.5 and 4 hours, the at least one region being exposed to a maximum temperature between 750 and 1250° C. for 5 to 60 minutes during the volume crystallization,
   carrying out the volume crystallization in a temperature range between 750 and 1250° C., the temperatures of the upper and lower faces of the at least one ceramizing region of the green glass being continuously measured and the heating being controlled using this information based on target values by a measuring and control apparatus, and
   moving the at least one region forward on rollers during the volume crystallization at an advancing rate ranging between 0.2 and 10 m/min.,
   wherein the viscosity of the at least one region of the green glass during the volume crystallization ranges, at least intermittently, between $10^7$ and $10^{11}$ dPa·s by adjusting the advancing rate and the temperature and
   wherein the temperature and the advancing rate are controlled so that the following applies with respect to the distance $x_{Roller}$ of the roller axes:
$x_{Roller}^5 \leq 360 * (R_a * t_{Pane}^2)/(\rho * g) * v * \eta$, where $R_a$ is the maximum glass deflection, $t_{Pane}$ is the glass thickness, $\rho$ is the glass density, g is the acceleration due to gravity, v is the advancing rate and $\eta$ is the minimum viscosity of the glass.

2. The method according to claim 1, wherein the green glass is conveyed and/or supported on rollers disposed at a distance from one another so that, at the prevailing parameters consisting of the temperature and advancing rate, a waviness of the ceramized green glass, measured between wave valley and wave peak, of less than 100 μm is generated.

3. A method according to claim 1 the green glass that is being ceramized has a composition from the following composition range:

| | |
|---|---|
| 60-73.0 wt. % | $SiO_2$, |
| 15-25.0 wt. % | $Al_2O_3$, |
| 2.0-5.0 wt. % | $Li_2O$, |
| 0-5.0 wt. % | CaO + SrO + BaO, |
| 0-5.0 wt. % | $TiO_2$, |
| 0-5.0 wt. % | $ZrO_2$, |
| 0-4.0 wt. % | ZnO |
| 0-3.0 wt. % | $Sb_2O_3$, |
| 0-3.0 wt. % | MgO, |
| 0-3.0 wt. % | $SnO_2$ |
| 0-2.0 wt. % | $P_2O_5$, |
| 0-1.5 wt. % | $As_2O_3$, |
| 0-1.2 wt. % | $Na_2O + K_2O$, with the respective contents preferably being within the ranges provided below, |
| 0-1.0 wt. % | $Na_2O$, |
| 0-0.5 wt. % | $K_2O$. |

4. A method according to claim 1 the temperature is controlled so that it does not deviate in the furnace by more than −5° C. to +5° C. from a predefined target temperature $T_x$ over the width of the green glass $T_y$ to be ceramized, or a temperature difference between the upper and lower faces of the green glass to be ceramized in the furnace ranges between −0.5° and +1° C.

5. A method according to claim 1 the temperatures of the upper and lower faces of at least one ceramizing segment of the green glass are measured by temperature sensors having a response time of one second and the heating is controlled within 10 seconds.

6. A method according to claim 1, wherein green glass plates are placed obliquely on the conveying apparatus so that one of the corners of the glass plate leads the remaining plate.

* * * * *